(12) United States Patent
Fu et al.

(10) Patent No.: US 10,104,061 B2
(45) Date of Patent: *Oct. 16, 2018

(54) METHOD AND SYSTEM FOR DISTINGUISHING HUMANS FROM MACHINES AND FOR CONTROLLING ACCESS TO NETWORK SERVICES

(71) Applicant: Alibaba Group Holding Limited, Grand Cayman (KY)

(72) Inventors: Yingfang Fu, Beijing (CN); Yudong Zhang, Hangzhou (CN); Qian Zhang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/598,150

(22) Filed: May 17, 2017

(65) Prior Publication Data

US 2017/0318010 A1 Nov. 2, 2017

Related U.S. Application Data

(63) Continuation of application No. 14/243,804, filed on Apr. 2, 2014, now Pat. No. 9,686,269.

(30) Foreign Application Priority Data

Apr. 3, 2013 (CN) .......................... 2013 1 0113912

(51) Int. Cl.
*H04L 29/06* (2006.01)
*G06F 21/31* (2013.01)
*G06F 21/33* (2013.01)

(52) U.S. Cl.
CPC ........ *H04L 63/0823* (2013.01); *G06F 21/316* (2013.01); *G06F 21/335* (2013.01); *G06F 2221/2133* (2013.01)

(58) Field of Classification Search
CPC .. H04L 29/00; G06F 3/00; G06T 9/00; H04N 7/00
See application file for complete search history.

(56) References Cited

U.S. PATENT DOCUMENTS 7,516,220 B1 4/2009 Stiert
8,509,680 B2 8/2013 Atsmon et al.
(Continued)

FOREIGN PATENT DOCUMENTS

JP 2005157845 A 6/2005
JP 2009526328 A 7/2009
(Continued)

OTHER PUBLICATIONS

The European Office Action dated Apr. 10, 2017 for European Patent Application No. 147258446, a counterpart foreign application of U.S. Appl. No. 14/243,804, 6 pages.
(Continued)

*Primary Examiner* — Joseph P Hirl
*Assistant Examiner* — Leynna T Truvan
(74) *Attorney, Agent, or Firm* — Lee & Hayes, PLLC

(57) ABSTRACT

A method and an apparatus for distinguishing humans from computers and for controlling access to network services. One intended application of the method is a CAPTCHA technique, deployed using a shared Trusted Computing technology over a trusted network of a user terminal, a network server, and a Trusted Party, any of which may be at a Decision Point. The method distinguishes a human user making a legitimate request for network access from a programmed computer making undesired requests, by detecting unusually high network access request frequencies made by an identifiable user and/or a trusted module from the user terminal. The CAPTCHA function is further used to improve the method for controlling access to network ser-
(Continued)

vices. The information transmitted between the members of the trusted network may be encrypted.

20 Claims, 6 Drawing Sheets

(56) References Cited

U.S. PATENT DOCUMENTS

| | | | |
|---|---|---|---|
| 9,027,086 | B2 | 5/2015 | Islam et al. |
| 2004/0025055 | A1 | 2/2004 | Hamadi et al. |
| 2007/0078983 | A1 | 4/2007 | Modrall |
| 2007/0143624 | A1 | 6/2007 | Steeves |
| 2007/0234432 | A1 | 10/2007 | Korkishko et al. |
| 2008/0263636 | A1 | 10/2008 | Gusler et al. |
| 2010/0192201 | A1 | 7/2010 | Shimoni et al. |
| 2010/0318669 | A1 | 12/2010 | Chugh |
| 2011/0320816 | A1 | 12/2011 | Yao et al. |
| 2012/0159564 | A1 | 6/2012 | Spektor et al. |
| 2012/0246293 | A1 | 9/2012 | De Jager et al. |
| 2013/0019286 | A1 | 1/2013 | Barborak et al. |
| 2013/0205370 | A1 | 8/2013 | Kalgi et al. |
| 2013/0326636 | A1 | 12/2013 | Prchal et al. |
| 2014/0304797 | A1 | 10/2014 | Fu et al. |

FOREIGN PATENT DOCUMENTS

| | | |
|---|---|---|
| JP | 2012507065 A | 3/2012 |
| WO | WO2007095242 A2 | 8/2007 |
| WO | WO2012073233 A1 | 6/2012 |

OTHER PUBLICATIONS

Office action for U.S. Appl. No. 14/243,804, dated Oct. 23, 2015, Fu et al., "Method and System for Distinguishing Humans From Machines and for Controlling Access to Network Services," 22 pages.

Office action for U.S. Appl. No. 14/243,804, dated Dec. 28, 2016, Fu et al., "Method and System for Distinguishing Humans From Machines and for Controlling Access to Network Services," 20 pages.

Office Action for U.S. Appl. No. 14/243,804, dated Apr. 8, 2015, Fu et al.,"Method and System for Distinguishing Humans From Machines and for Controlling Access to Network Services," 19 pages.

Office action for U.S. Appl. No. 14/243,804, dated Jun. 27, 2016, Fu et al., "Method and System for Distinguishing Humans From Machines and for Controlling Access to Network Services," 24 pages.

PCT Search Report and Written Opinion dated Jul. 11, 2014 for PCT Application No. PCT/US14/32730, 10 pages.

The European Office Action dated Jun. 13, 2018 for European Patent Application No. 14725844.6, a counterpart foreign application of U.S. Pat. No. 9,686,269, 5 pages.

The Japanese Office Action dated Jun. 5, 2018 for the Japanese Patent Application No. 2016-506593, a counterpart foreign application of U.S. Pat. No. 9,686,269, 9 pages.

METHOD AND SYSTEM FOR DISTINGUISHING HUMANS FROM MACHINES AND FOR CONTROLLING ACCESS TO NETWORK SERVICES

RELATED PATENT APPLICATIONS

This application is a continuation of and claims priority to U.S. patent application Ser. No. 14/243,804, filed on Apr. 2, 2014, the disclosure of which is incorporated by reference herein which claims foreign priority to Chinese Patent Application No. 201310113912.5 filed on Apr. 3, 2013, entitled "METHOD AND SYSTEM FOR DISTINGUISHING HUMANS FROM MACHINES AND FOR CONTROLLING ACCESS TO NETWORK SERVICES," Chinese Patent Application is hereby incorporated by reference in its entirety.

TECHNICAL FIELD

The present application relates to computer technologies, and more particularly to techniques for distinguishing humans from machines.

BACKGROUND

With the popularity of the Internet, various Web services are increasingly becoming part of everyday life, such as e-commerce, e-mail services, downloads and more resources, which are often free to access. However, these services intended for the human users are often abused or attacked by unauthorized users and malicious computer programs. These unauthorized activities take up service resources, generate a lot of Web junk and spamming, affect user experiences, and threaten the security of Web services.

Techniques exist for distinguishing humans from machines in order to reduce the attacks by machines word computers. An example of such techniques is CAPTCHA (Completely Automated Public Turing test to tell computers and humans apart), which is a security measure for authentication using challenge-response tests to tell a human from a computer. CAPTCHA uses a server computer to generate CAPTCHA challenges (tests) and to evaluate the responses. As a user intends to use a Web service which requires authentication, the server provides the user with a challenge (test); the user responds to the challenge by submitting the response to the server; and the server assesses whether the user has met the challenge according to the response.

The current CAPTCHA techniques primarily include text CAPTCHA, image CAPTCHA, and sound CAPTCHA. These techniques are based on different issues identified in the field of AI, and have different characteristics.

Text CAPTCHA takes advantage of the differences in human recognition of textual characters and machine recognition of the same, and uses verification codes to distinguish between human and machine. A verification code used in text CAPTCHA may be a distorted picture created using a string of numbers or symbols randomly generated. Interference pixels are often added to the distorted picture to prevent optical character recognition. A human user visually recognizes the verification code contained in the distorted picture, and submits the recognized verification code, and is allowed to use the service if the submitted verification code is correct. Examples of text CAPTCHA are the website of CSDN (Chinese Software Developer Network) which uses GIF format+numbers for user logon; website of QQ which uses randomly generated characters for website registration, and uses PNG format images with random numbers+random capital letters for logon; MSN and Hotmail which uses BMP format with random numbers+random capital letters+random interference for new account registration+random bits; Google Gmail which uses JPG format with random numbers+random colors+random lengths+random positions for new account registration; and certain large forums which adopted XBM format with random content.

Image CAPTCHA takes advantage of the differences between humans and machines in image classification, object identification, common sense understanding and other aspects. Image CAPTCHA is usually independent of different languages, requires no user input text, and is harder to crack. One example of image CAPTCHA is CAPTCHA BONGO designed by Carnegie Mellon University which uses two types of visual model (such as lines, circles, boxes, etc.), and allows users to determine the type of the new model. However, the design of selecting one model out of the two options cannot guarantee safety. Another example is CAPTCHA using an annotated image database. A weakness of this algorithm lies in that once the database is leaked, the algorithm's security collapses. Google's What's Up app uses a CAPTCHA algorithm that is based on image orientation recognition. An image is rotated perpendicular to its original orientation. What's Up requires no image annotation. It continues to add candidate images during the tests, and uses user feedback to correct initial annotations. Furthermore, What's up has an automatic image orientation filter that is trained to detect and filter out images that are machine recognizable, and also detect and filter out images that are difficult for human recognition, to ensure that the test can be passed by most human users but not by machines. Compared with CAPTCHA based on the image classification, What's Up challenges the users with more difficult image-understanding questions and requires the user to analyze the content of the image. The technique enjoys a very large usable base of images which are not limited to specific items, and its automatic image annotation based on user feedback also results in less tedious human intervention.

Sound CAPTCHA takes advantage of the differences in human and machine speech recognition. The technique plays at random intervals one or more human-spoken numbers, letters or words, and adds background noise to resist ASR (Automatic Speech Recognition) attack. For example, in sound CAPTCHA BYAN-I and BYAN-II, the user is prompted to select a preferred language, while the computer randomly selects six numbers, generates a test audio accordingly, and adds another speaker's voice as background noise. The user is prompted to enter the six numbers correctly recognized in the audio. In BYAN-I, background noise is the same six numbers spoken in a different language, while in BYAN-II the background noise is the sound of random selected numbers or words.

The current mainstream CAPTCHA techniques, while being capable of avoiding some degree of malicious computer program abuse of Web services, are vulnerable to a variety of attacks and easy to crack, and result in poor user experiences.

More specifically, although text CAPTCHA that distorts the text does to a degree prevent a malicious computer program from registering or logging on, the advancements in character segmentation and optical character recognition (OCR) have cracked most text CAPTCHA algorithms. CAPTCHA algorithms based on simple character recognition challenges are no longer able to stop computer programs. Besides, distorted text images are difficult to be recognized by humans, and result in poor user experience.

Image CAPTCHA takes advantage of the differences between humans and machines in image classification, object identification, commonsense understanding and other aspects. This technique is usually independent of different languages, requires no user input text, and is more difficult to crack than text CAPTCHA. However, image CAPTCHA requires extensive database support, is difficult to be produced in large scale, and is further vulnerable to attacks by machine learning algorithms. For example, Golle designed an SVM (Support Vector Machine) classifier which combines colors and texture features to classify images of cats and dogs, and achieved 82.7% success rate on single images and a success rate up to 10.3% on Asirra which contains 12 graphs.

Sound CAPTCHA is equally susceptible to attacks by machine learning algorithms. Tam et al. uses a fixed-length audio search window to identify energy peaks for recognition, and extracts three kinds of audio features therefrom, namely Mel-Frequency Cepstral Coefficient, Perceptual Linear Prediction, Correlation Spectral Inversion Perceptual Linear Prediction, and uses three machine learning algorithms (AdaBoost, SVM, and k-NN) to train. The method achieved success rates of 67%, 71% and 45% on Google, Digg and ReCAPTCHA, respectively. Similar methods were also used to crack eBay's voice CAPTCHA, achieving a success rate up to 75%.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

The present disclosure provides a method and an apparatus for distinguishing humans from computers and for controlling access to network services. One intended application of the method is human-machine recognition based on a CAPTCHA technique, deployed using a shared Trusted Computing technology over a trusted network of a user terminal, a network server, and a Trusted Party. The method distinguishes a human user making a legitimate request for network access from a programmed computer making undesired requests using a malicious program, by detecting unusually high network access request frequencies made by an identifiable user and/or a trusted module on the user terminal. The CAPTCHA function may be performed in addition to the regular Trusted Computing functions over the trusted network.

One aspect of the disclosure is a method for distinguishing humans from computers, wherein any of a user terminal, a network server, and a Trusted Party may be at a Decision Point of a trusted network for distinguishing humans from computers. The method uses a Decision Point to receive from the user terminal a first request for network service access, where the first request carries a first identity certificate issued by the Trusted Party and signed by a signature containing a user ID and/or a trusted module ID related to the user terminal. The Decision Point further verifies the user ID and/or the trusted module ID according to the first identity certificate; determines whether the user ID and/or the trusted module ID has a network service access request frequency that exceeds a threshold frequency; and decides whether the first request for network service access is made by a human user, based on whether the network service access request frequency exceeds the threshold frequency. The Decision Point may reject the first request for network service access if the first request is decided to not be made by a human user.

In one embodiment, the user terminal, the network server, and the Trusted Party each has a respective Trusted Computing platform implemented. The trusted module ID identifies a trusted module tied to the user terminal, and is part of the Trusted Computing platform of the user terminal.

The network service access request frequency is measured by counting the number of network service access requests carrying the user ID and/or the trusted mobile ID occurred within a preset period of time.

Upon deciding that the first request for network service access is made by a human user, based on whether the network service access request frequency exceeds the threshold frequency, the Decision Point sends an authorization credential to the user terminal and to the network server. The user terminal sends to the network server a second request for network service access using the received authorization credential as a proof. Using the authorization credential received from the Decision Point, the network server verifies the authorization credential received from the user terminal, and allows the user terminal to access the requested network service.

In this embodiment, the Decision Point may first encrypt the authorization credential using identity information of the user terminal as a public key, and then send to the user terminal the encrypted authorization credential along with a second identity certificate issued to the Decision Point by the Trusted Party. The user terminal verifies the received second identity certificate, and obtains the authorization credential by decrypting the encrypted authorization credential using a private key corresponding to the identity information of the user terminal.

Likewise, in the above embodiment, the Decision Point may first also encrypt the authorization credential using identity information of the network server as a public key, and then send to the network server the encrypted authorization credential along with a second identity certificate issued to the Decision Point by the Trusted Party. The network server verifies the received second identity certificate, and obtains the authorization credential by decrypting the encrypted authorization credential using a private key corresponding to the identity information of the network server.

Another aspect of the disclosure is a computer-based apparatus for distinguishing humans from computers. The apparatus includes a computer having one or more processors, computer-readable memory and storage medium, and I/O devices. The computer is programmed to perform functions that are needed to carry out a method disclosed herein. For example, in one embodiment the computer is programmed to receive from a user terminal a first request for network service access, where the first request carries a first identity certificate issued by a Trusted Party and signed by a signature containing a user ID and/or a trusted module ID belonging to the user terminal; verify the user ID and/or the trusted module ID according to the first identity certificate; determine whether the user ID and/or the trusted module ID has a network service access request frequency that exceeds a threshold frequency; and decide whether the first request for network service access is made by a human user, based on whether the network service access request frequency exceeds the threshold frequency.

Other features of the present disclosure and advantages will be set forth in the following description, and in part will become apparent from the description, or understood by practice of the application. Purposes of this application and other advantages can be obtained by the written description, claims, and drawings of the structure particularly pointed out realized and attained.

DETAILED DESCRIPTION

Figure 1:
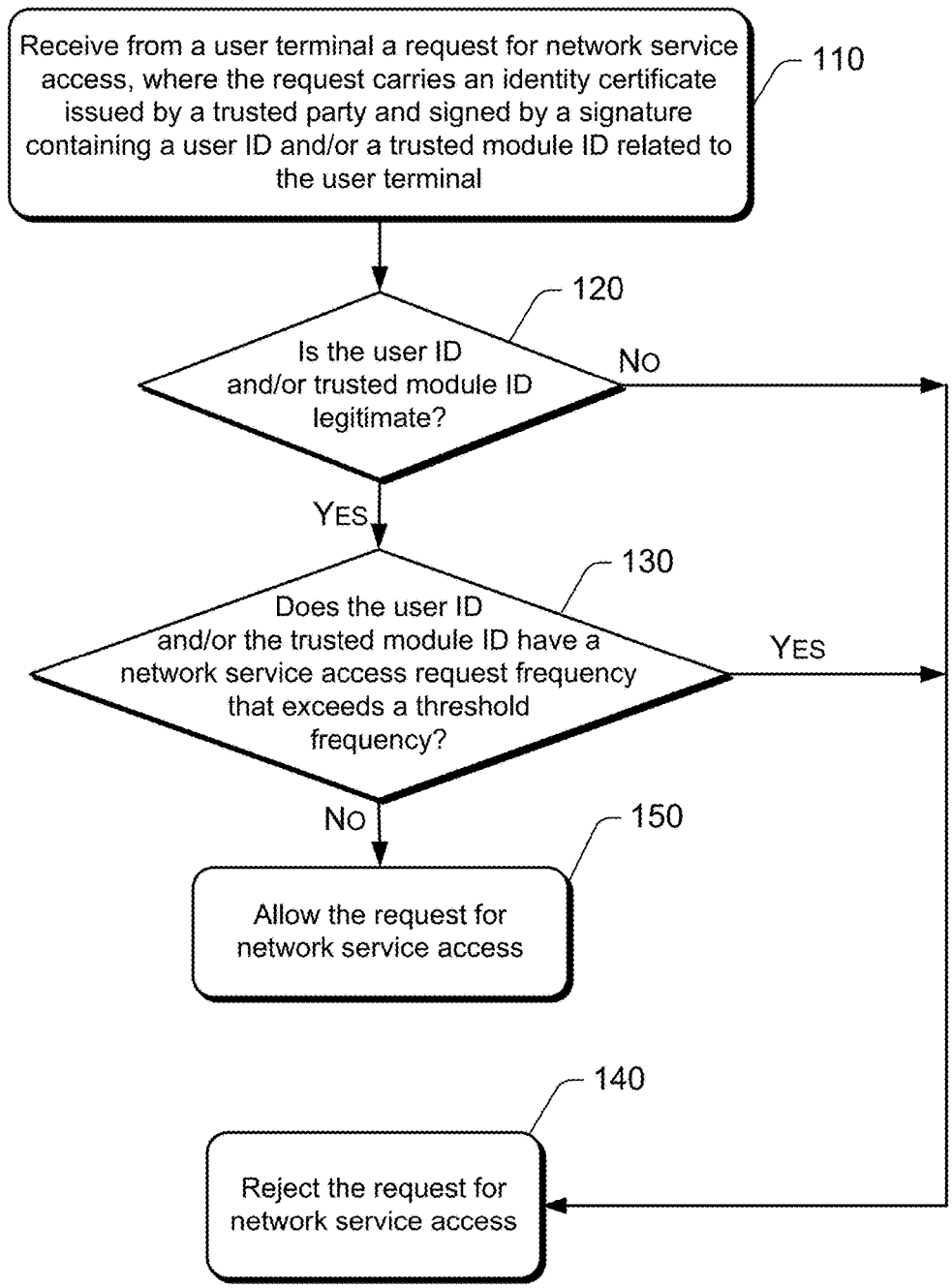
FIG. 1 is a schematic flow of an embodiment of the method for distinguishing humans from machines in accordance with the present disclosure.

In order to facilitate understanding of the above purpose, characteristic and advantages of the present disclosure, the present disclosure is described in further detail in conjunction with accompanying figures and example embodiments. In the description, the term "technique(s)," for instance, may refer to method, apparatus device, system, and/or computer-readable instructions as permitted by the context above and throughout the present disclosure.

In this description, the order in which a process is described is not intended to be construed as a limitation, and any number of the described process blocks may be combined in any order to implement the method, or an alternate method. An embodiment is described in sequential steps only for the convenience of illustration. Unless it would cause a conflict, the examples and embodiments described in the present disclosure, and the characteristics and features thereof, may be combined freely. Further, not every step described in the embodiments is required in order to practice the techniques of this disclosure.

This disclosure discloses using Trusted Computing technology over a trusted network for distinguishing humans from computers (as in CAPTCHA) and for controlling access to network services. The trusted network may include a user terminal, a network server, and a Trusted Party, any of which may be at a Decision Point of the trusted network for distinguishing humans from computers. The method distinguishes a programmed computer from a human user by detecting unusual network access request frequencies made by a user.

Although the normal purpose of Trusted Computing technology is generally related to secure computing, the present disclosure uses Trusted Computing technology for a broader purpose, which includes human-machine recognition to tell apart the computer from a human user in a CAPTCHA type application. In practice, an access request may come from a user terminal having a Trusted Computing component such as a trusted platform module, and is therefore secure in the normal sense of Trusted Computing, yet undesired or illegitimate in the context of human-machine recognition.

Trusted Computing ensures the safety of an entire system through enhancing the security architecture of the existing terminals. Its main idea is to use Trusted Platform Modules (TPM) embedded in a variety of devices including desktops, laptops and smart phones, etc., as a core to provide security for users and platforms. TPM establishes a Trusted Computing environment through a series of tools, such as storage, measurement, reporting to solve some of the security problems caused by attacks. TPM has multiple trusted attributes such as the ability to perform remote attestation, the ability to respond to a party requesting for remote authentication, and the ability to prove the identity of the platform and platform integrity.

In addition, Trusted Computing Group (TCG) presented in their TPM v1.1b specification an anonymous attestation scheme using Privacy Certificate Authority (Privacy CA). The scheme ensures anonymity by issuing alias certificates for Endorsement Key (EK) certificates of a client platform, using Privacy CA as a Trusted Party, and ensures non-association between multiple certificates of the platform using one-time padding.

According to different purposes of keys, TCG defines seven types of keys, among which keys related to platform identity attestation primarily include:

Endorsement Key (EK): a private key used to uniquely identify a Trusted Platform Module (TPM), generally created by the TPM manufacturer in the manufacture of the TPM. The EK affects the security of the entire system. It is only used for two purposes. The first is to decrypt data authorized by the platform owner when determining the identity of the platform owner; and the second is to create Attestation Identity Keys (AIK) and establish alias of the platform identity.

Attestation Identification Key (AIK): Dedicated for signing data (such as PCRs value, etc.) created by TPM to prove the legitimacy of the platform and the credibility of platform environments.

For the purpose of applying and managing keys and platform attestation, TCG defines five types of credentials, each type being used to provide the necessary information for a particular operation. These credentials include:

Endorsement Credential: also known as EK credential, usually issued by vendors who generate Endorsement Keys. Endorsement credential includes TPM manufacturer name, TPM model, TPM version number, EK public key and other information. Although EK public key is public, but because it is the only proof to attest the TPM identity, it also has secrecy and sensitivity.

AIK Credential: used for identifying or checking the AIK private key used to sign PCR values. AIK credential includes AIK public key and other information deemed useful by the issuer. AIK certificate is issued by a service party that is trusted, capable of verifying a variety of certificates and able to protect user privacy. By issuing a certificate, the service party can prove the authenticity of a TPM which provides the TPM information.

Other TCG credentials include Conformance Credential, Platform Endorsement Credential and Validation Credential.

December 2007, the State Password Administration of China promulgated "Functionality and Interface Specification of Cryptographic Support Platform for Trusted Computing". The specification defines a Trusted Party (third party) as the center of the platform authentication system, replaces TPM using TCM (Trusted Cryptographic Module) as the Root of Trust. The principles and the basic process to issue certificates is the same as that of TCG Privacy CA system, but to adapt to China's national conditions, a dual certificate system and different cryptographic algorithms are used.

TCG's Trusted Network Connect architecture (TNC) contains three types of entities: Access Requester (AR), Policy Enforcement Point (PEP) and Policy Decision Point (PDP), which are logical entities, can be distributed in any position. To achieve interoperability between various components, TNC architecture provides a series of interfaces, IF-PEP, IF-T, IF-TNCCS, IF-IMC, IF-IMV and IF-M.

When accessing a network, an access requester (AR) sends an access request and collected information of platform integrity to the PDP to request a network connection. This message is forwarded by the Policy Enforcement Point (PEP). Upon receiving the message, PDP makes a decision with regard to the request based on the local security policies, the identity of the AR and the integrity of the AR's platform. The decision may be to allow, deny, or isolate. The PDP then sends the decision to PEP, which carries out the decision.

TNC architecture is divided into three vertical levels, from bottom to top including:

Network Access Layer, which is used to support traditional network connectivity technologies, such as 802.1X and VPN, used for user identity authentication, key agreement, establishment of a security channel, and, after completion, informing the upper-layer (integrity assessment layer) to perform the protocol of integrity assessment;

Integrity Assessment Layer, which is responsible for assessing the integrity of all platforms requesting network access, wherein the performing of the protocol of this layer is protected by the security channel of the Network Access Layer; and Integrity Measurement Layer, which collects and verifies the components of integrity-related information of the Access Requester.

Example Embodiment One

An example of a method for distinguishing a human user from a computer (human-machine recognition) based on Trusted Computing is described below.

The method may identify illegitimate users based on identity authentication of Trusted Computing. Further, the method takes advantage of the fact that in reality a user ID can only be tied to a limited number of TPM ID's, and conversely a TPM ID can only be tied to a limited number User IDs. In other words, within a limited period of time, one machine can only be operated by a limited human user, or one person can only operate a limited number of machines. Therefore, if in a limited period of time, a user ID is found to be tied to a large number of TPM ID's, or a TPM ID is found to be tied to a large number of user ID's, it may be determined to be a result of a malicious computer program, rather than a legitimate human user.

The disclosed method may be implemented at any human-computer recognition Decision Point (for distinguishing a human user from a computer) on a trusted network, which includes user terminals, network servers and Trusted Party. The Decision Point may be any of these members on the trusted network, or another member such as a dedicated server on the same trusted network.

As shown in FIG. 1, the exemplary human-machine recognition method includes a process described as follows.

At block 110, the Decision Point receives from a user terminal a first request for network service access, where the request carries a first identity certificate issued by a Trusted Party and signed by a signature containing a user ID and/or a trusted module ID related to the user terminal.

Trusted module refers to a module of trusted computing technology embedded in a device as the core of trusted computing to provide security for users and platforms. Examples of trusted modules are TPM or TCM.

At block 120, the Decision Point determines, based on the first identity certificate, whether the user ID and/or trusted module ID is legitimate. This may be performed according to the regular Trusted Computing protocols. If the result is affirmative, the process proceeds to block 130, otherwise, the process proceeds to block 140.

At block 130, based on the user ID and/or the trusted module ID, the Decision Point determines whether the user ID and/or the trusted module ID has a network service access request frequency that exceeds a threshold frequency. If the result is affirmative, the process proceeds to block 140, otherwise, the process proceeds to block 150.

Network service access request frequency refers to a frequency of requests that have been made for network service access. To determine this frequency, the Decision Point may count the number of network service access requests that the user ID and/or the trusted mobile ID and that have occurred within a preset period of time. The determined frequency is then compared with the threshold frequency, which can have a preset value.

At block 140, the Decision Point rejects the first request for network service access.

At block 150, the Decision Point allows the first request for network service access.

In some embodiments, the Decision Point decides at block 130 whether the first request for network service access is made by a human user, rather than a programmed computer or robot, based on whether the network service access request frequency exceeds the threshold frequency. If the network service access request frequency exceeds the threshold frequency, the Decision Point may decide that the request is from a programmed computer or robot making illegitimate requests. If the network service access request frequency does not exceed the threshold frequency, the Decision Point may decide that the request is made by a legitimate human user. This decision forms a basis for further decisions on network service access.

Upon deciding at block 150 to allow the first request for network service access (or if it is decided by the Decision Point that the first request for network service access is made by a human user), the Decision Point may send an authorization credential of the user terminal to the user terminal and also to a network server which provides a requested network service.

The Decision Point may first encrypt the authorization credential using identity information of the user terminal as a public key (or may alternatively use another public key that belongs to the user terminal), and send to the user terminal the encrypted authorization credential along with a second identity certificate issued to the Decision Point by the Trusted Party. Likewise, the Decision Point may also encrypt the authorization credential using identity information of the network server as a public key (or may alternatively use another public key that belongs to the network server), and send to the network server the encrypted authorization credential along with the second identity certificate issued to the Decision Point by the Trusted Party.

In some embodiments, the Decision Point may blacklist the user ID and/or the trusted module ID if it has decided to reject the first request for network service access (or if it has decided the first request for network service access is not made by a human user). Accordingly, before deciding whether the first request for network service access is made by a human user, the Decision Point may first check the user ID and/or trusted module ID against an existing blacklist of user IDs and trusted module IDs, and reject the first request if the user ID and/or the trusted module ID is found in the blacklist, before making the determination of block 130.

As described above, according to the disclosed method, the Decision Point first determines whether the user ID and/or trusted module ID is legitimate using regular Trusted Computing protocols, and rejects access to the network service if the request does not pass this Trusted Computing test. This helps avoid the network resources from being abused by unauthorized users. At the same time, by monitoring the access request frequency of a certain user ID and/or trusted module ID, the method effectively prevents abuses of the network resources in situations where malicious programs are used to control multiple machines with one user account or used to assert multiple user accounts on a single machine. Compared to the prior art CAPTCHA techniques based on texts, images and sounds, the disclosed method is harder to crack and may have higher human-machine recognition accuracy, and would thus result in better security of network service systems.

Example Embodiment Two

The present disclosure also discloses an embodiment of a method for controlling network service access using CAPTCHA decisions based on human-machine recognition. The method is applied over a trusted network, which may include a Trusted Party, a user terminal, a human-machine recognition Decision Point and a network server.

Figure 2:
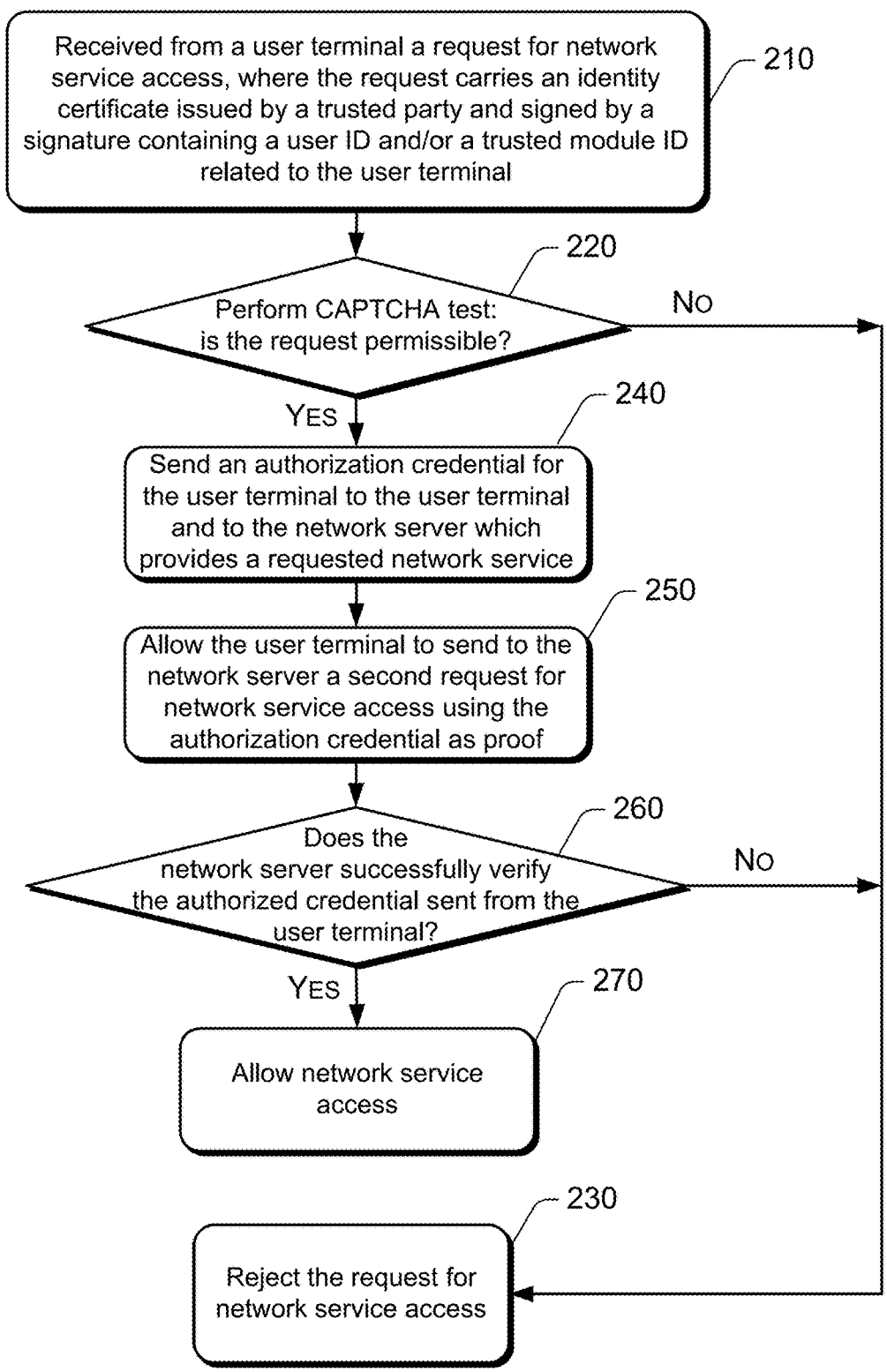
FIG. 2 is a schematic flow of an embodiment of the method for controlling access to network services in accordance with the present disclosure.

As shown in FIG. 2, the method for controlling network service access has a process described as follows.

At block 210, the Decision Point receives from a user terminal a first request for network service access, where the request carries a first identity certificate issued by a Trusted Party and signed by a signature containing a user ID and/or a trusted module ID related to the user terminal.

At block 220, the Decision Point performs a process to distinguish a human user from the computer. The process may be an example process of human-machine recognition described in FIG. 1, used to decide whether the first request is legitimate (or whether the first request is from a human user). If yes, the Decision Point allows the first request and the process proceeds to block 240. If no, the Decision Point rejects the first request, and the process proceeds to block 230.

At block 230, the Decision Point rejects the first request, and sends a rejection response to the user terminal to end the process.

At block 240, the Decision Point sends an authorization credential of the user terminal to the user terminal and also to a network server which provides a requested network service.

The Decision Point may first encrypt the authorization credential using identity information of the user terminal as a public key, and send to the user terminal the encrypted authorization credential along with a second identity certificate issued to the Decision Point by the Trusted Party. Likewise, the Decision Point may also encrypt the authorization credential using identity information of the network server as a public key, and send to the network server the encrypted authorization credential along with the second identity certificate issued to the Decision Point by the Trusted Party.

At block 250, the user terminal is allowed to send to the network server a second request for network service access using the authorization credential as proof.

In cases where the authorization credential received at the user terminal is encrypted by the Decision Point as described above, the user terminal may need to first decrypt the authorization credential before sending it to the network server as proof. To do this, the user terminal first verifies the received second identity certificate, then obtains the authorization credential by decrypting the encrypted authorization credential using a private key corresponding to the identity information of the user terminal.

At block 260, the network server verifies the authorization credential sent from the user terminal. To do this, the network server compares the authorization credential received from the user terminal at block 250 with the authorization credential received from the Decision Point at block 240. If they match, the verification is successful, the process proceeds to block 270. If not, the process proceeds to block 230.

In case where the authorization credential received at the network server is encrypted by the Decision Point as described above, the network server may need to first decrypt the authorization credential before using it to verify the authorization credential received from the user terminal. To do this, the network server first verifies the received second identity certificate, and then obtains the authorization credential by decrypting the encrypted authorization credential using a private key corresponding to the identity information of the network server.

At block 270, the user terminal is allowed to access the network service.

At this block, the network server may send to the user terminal a response indicating allowing access to the requested network service. The response carries a third identity certificate issued to the network server by the Trusted Party. Upon receiving the response, the user terminal verifies the third identity certificate, and if successful, accesses the requested network service.

The above described methods and processes may be implemented on a control system for controlling access to network services, the control system being based on Trusted Computing. An example of such a control system is implemented over a trusted network, which includes a user terminal, a network server, and a Trusted Party, each having a respective Trusted Computing platform or module such as TPM or TCM using a shared (or mutually compatible) Trusted Computing technology. The trusted module ID identifies a trusted module tied to the user terminal. The trusted module may be part of the Trusted Computing platform of the user terminal. In some embodiments, the network server may be located at the Decision Point.

Figure 3A:
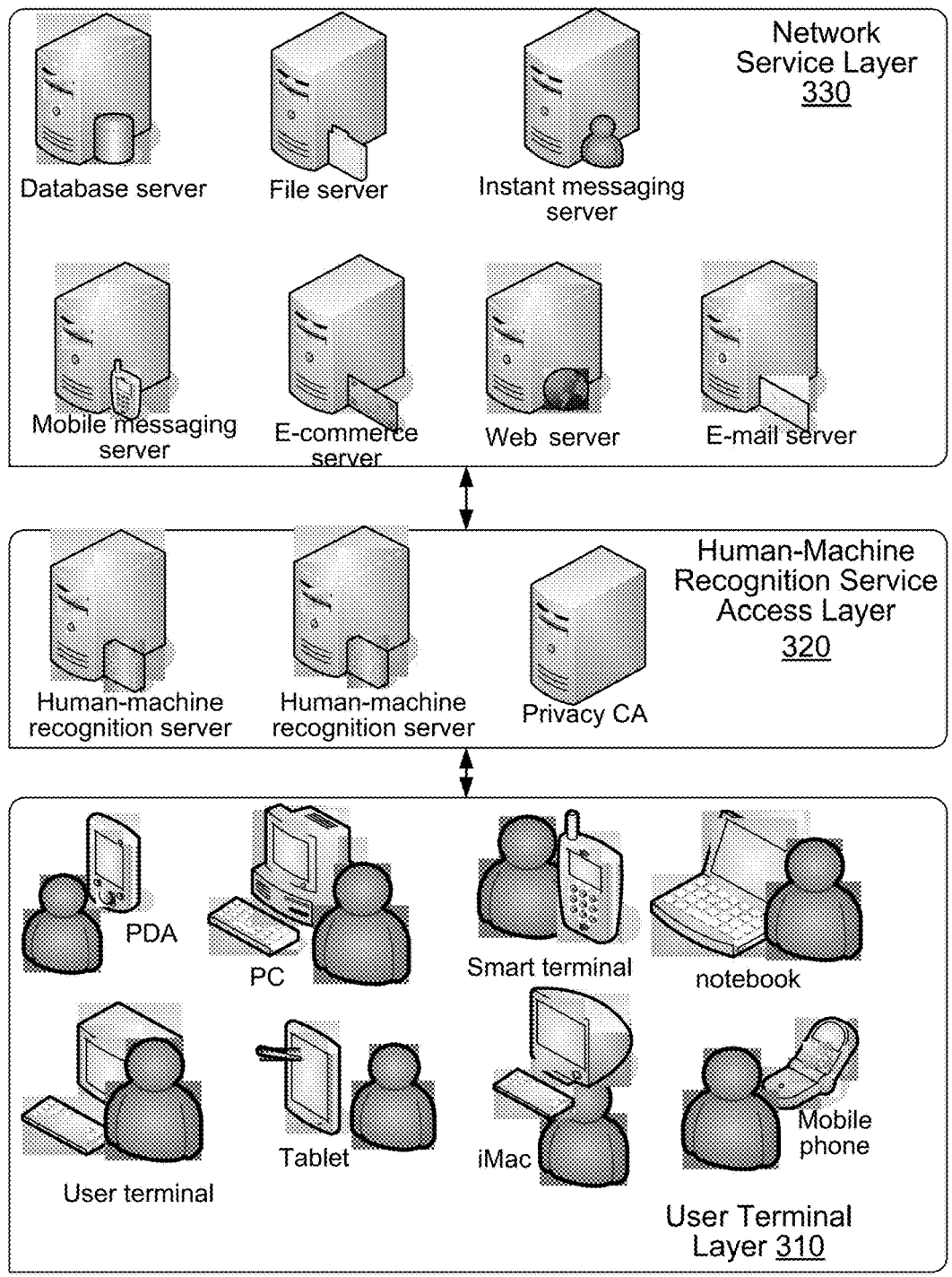
FIG. 3A and FIG. 3B are illustrations of a multilayered implementation environment of the method for distinguishing humans from machines and for controlling access to network services in accordance with the present disclosure.
Figure 3B:
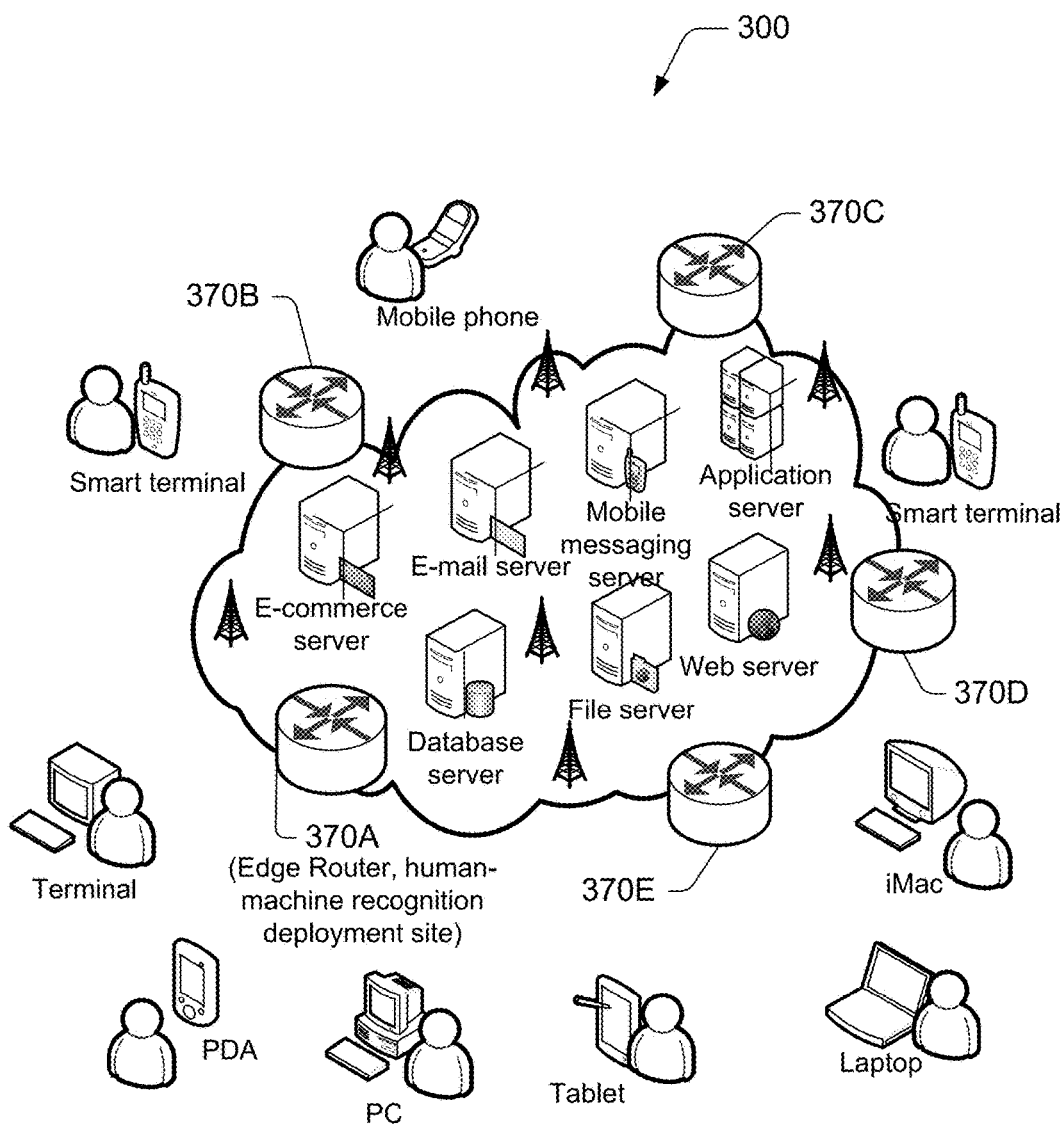

FIG. 3A and FIG. 3B are illustrations of a multilayered implementation environment of the method for distinguishing humans from machines and for controlling access to network services in accordance with the present disclosure.

The multilayered implementation environment 300 has an architecture that includes three layers. User terminal layer 310 includes one or more user terminals with a voice communication device. Examples of the user terminal device are PDA, desktop PC, smart mobile terminal, laptop computer, mobile phone, tablet, MAC computer, and generic client terminal. The user accesses the Web services through one of these user terminals.

Human-machine recognition service access layer 320 includes a Trusted Party such as Privacy CA and one or more human-machine recognition servers responsible for distinguishing human users from computers.

Network services layer 330 includes one or more network services to provide different server resources, including but not limited to, the following or any combination of: database server, file server, e-commerce server, application server, e-mail server, mobile messaging server, and Web server.

To access a network service that requires authentication, a user (or its user terminal) must pass the authentication test by a Decision Point of the human-machine recognition service access layer 320.

FIG. 3B shows a distributed deployment of human-machine recognition services. In this system, human-machine recognition function is distributedly deployed at multiple edge routers 370A, 370B, 370C, 370D, and 370E, instead of a dedicated server. A distributed deployment of FIG. 3B has the benefit of distributing management based on load balancing algorithms to prevent a single point of failure attack, and thus may improve Web service system performance.

The above-described techniques may be implemented with the help of one or more non-transitory computer-readable media containing computer-executable instructions. The non-transitory computer-executable instructions enable a computer processor to perform actions in accordance with the techniques described herein. It is appreciated that the computer readable media may be any of the suitable memory devices for storing computer data. Such memory devices include, but not limited to, hard disks, flash memory devices, optical data storages, and floppy disks. Furthermore, the computer readable media containing the computer-executable instructions may consist of component(s) in a local system or components distributed over a network of multiple remote systems. The data of the computer-executable instructions may either be delivered in a tangible physical memory device or transmitted electronically.

In connection to the method disclosed herein, the present disclosure also provides a computer-based apparatus for implementing the method described herein.

In the presence disclosure, a "module" in general refers to a functionality designed to perform a particular task or function. A module can be a piece of hardware, software, a plan or scheme, or a combination thereof, for effectuating a purpose associated with the particular task or function. In addition, delineation of separate modules does not necessarily suggest that physically separate devices are used. Instead, the delineation may be only functional, and the functions of several modules may be performed by a single combined device or component. When used in a computer-based system, regular computer components such as a processor, a storage and memory may be programmed to function as one or more modules to perform the various respective functions.

Figure 4:
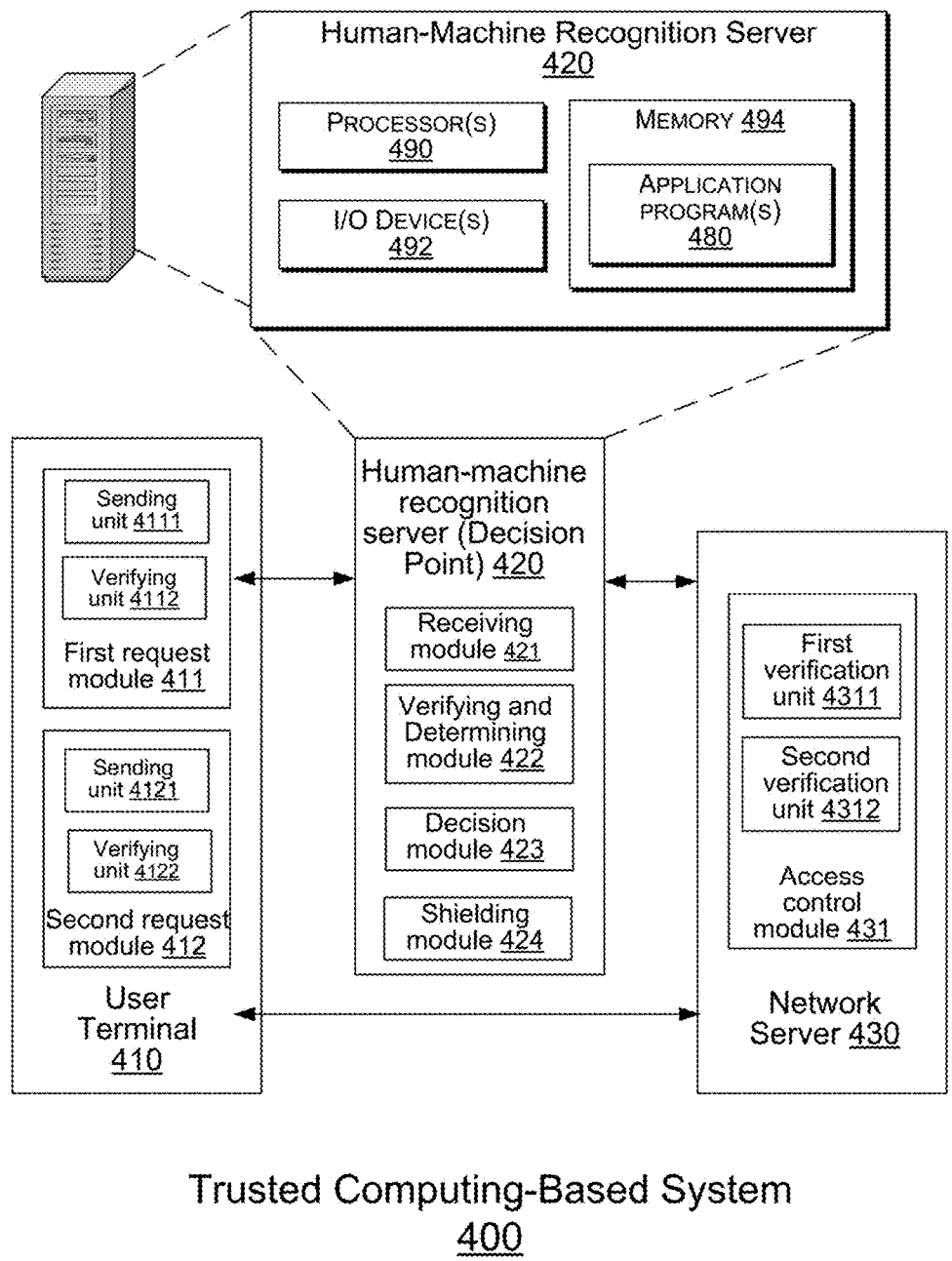
FIG. 4 is a schematic diagram of the function blocks of a system implementing the method for distinguishing humans from machines and for controlling access to network services in accordance with the present disclosure.

FIG. 4 is a schematic diagram of an implementation of a human-machine recognition system based on Trusted Computing. The Trusted Computing-based system 400 includes user terminal 410, human-machine recognition server 420, and network server 430. Human-machine recognition server 420 serves as a Decision Point for distinguishing human users from computers. Server 420 can be based on a typical server hardware which has one or more processor(s) 490, I/O devices 492, memory 494 which stores application program(s) 480.

Server 420 is programmed to have the functional modules as described in the following.

Receiving module 421 is programmed for receiving from user terminal 410 a first request for access to a network service provided by network server 430. The first request carries a first identity certificate issued by a Trusted Party (e.g., Privacy CA 540, not shown in FIG. 4) and signed by a signature containing a user ID and/or a trusted module ID belonging to the user terminal 410.

Verifying and determining module 422 is programmed for verifying the user ID and/or the trusted module ID according to the first identity certificate, and if verified, for further determining whether the user ID and/or the trusted module ID has a network service access request frequency that exceeds a threshold frequency. This corresponds to block 130 of FIG. 1 and is thus not repeated in detail.

Decision module 423 is programmed for deciding whether the first request for network service access is made by a human user, based on whether the network service access request frequency exceeds the threshold frequency, as described herein. Decision module 423 may further decide to allow or reject the first request and notify the user terminal 410. For example, as described in relation to FIG. 1 and FIG. 2, decision module 423 may decide to reject the first request if the request frequency exceeds the threshold frequency, but allows the first request if the request frequency does not exceed the threshold frequency.

Upon the decision made by decision module 423, human-machine recognition server (Decision Point) 420 may further perform encryption over authorization credential as described herein in relation to FIG. 1 and FIG. 2.

Shielding module 424 is programmed for blacklisting the user ID and/or the trusted module ID if the first request has been rejected or the request is determined to be not from a human user, as described herein in relation to FIG. 1 and FIG. 2. Accordingly, before deciding whether the first request for network service access is made by a human user, human-machine recognition server 420 may first check the user ID and/or trusted module ID against the existing blacklist of user IDs and trusted module IDs.

User terminal 410 may be a PC, smart phone, PDA, etc., and includes a first request module 411 and a second request module 412.

The first request module 411 includes sending unit 4111 programmed for sending the first request for network service access to human-machine recognition server 420 (Decision Point). The first request and the first identity certificate it carries are described in the process with reference to FIG. 1 and FIG. 2.

The first request module 411 further has verifying unit 4112 programmed for verifying the second identity certificate received from human-machine recognition server 420. If the second identification certificate is encrypted, user terminal 410 may further perform decryption in order to obtain the second identification certificate, as described in the process with reference to FIG. 1 and FIG. 2.

The second request module 412 has sending unit 4121 programmed to send to the network server 430 a second request for network service access using the authorization credential as proof.

The second request module 412 further has verifying unit 4122 programmed for verifying a third identity certificate received from the network server, as described in the process with reference to FIG. 1 and FIG. 2.

Network server 430 has an access control module 431, which includes a first verification unit 4311 and a second verification unit 4312.

First verification unit 4311 is programmed for verifying the second identity certificate received from human-machine recognition server 420. If the second identification certificate is encrypted, network server 430 may further perform decryption in order to obtain the second identification certificate, as described in the process with reference to FIG. 1 and FIG. 2.

Second verification unit 4312 is programmed for receiving the second request for network service access from the second request module 412 of the user terminal 410, and verifying the authorization credential of the user terminal 410. If the verification is successful, second verification unit 4312 may further send to the user terminal 410 a response indicating allowing access to a requested network service. The response carries a third identity certificate issued to the network server by the Trusted Party.

The Trusted Party, such as a Privacy CA, receives a request for identity enrollment from a system member (such as a user terminal, a CAPTCHA Decision Point, or a network server), verifies the legitimacy of the user information and the platform information, and also verifies the integrity of the platform. If the verification is successful, the Trusted Party assigns a user ID and a trusted module ID, and issues an identity certificate based on the user ID and/or trusted module ID. The issued identity certificate is to prove the identity of the user and/or the trusted module to the other members of the system. The identity certificate can follow the X.509 standard (but not limited to). The certificate includes a body portion (tbsCertificate), a signature algorithm identifier portion (signatureAlgorithm) and a signature value portion (signatureValue), where signatureValue is the resultant value after signing tbsCertificate using the signature algorithm specified in signatureAlgorithm. Usually, the body portion of the certificate and the signature value are collectively referred to as the signature. The signature includes a user ID and/or the trusted module ID (may also be called a Trusted Platform ID).

The signature includes both the user ID and the trusted module ID search that the user ID and the trusted module ID are tied together.

When issuing an identity certificate to assist the member, the Trusted Party may also issue an identity key based on the user ID and/or the trusted module ID. The identity certificate may be issued according to ways a TPM obtains an AIK certificate in the PCA system, or ways a TPM obtains a PIK certificate in the Chinese specification, or any other suitable ways. Furthermore, the Trusted Party may also store, modify or cancel identity keys and identity certificates.

The platform certificate and/or user certificate may be generated by a Privacy CA, so that the user can ensure the identity privacy and platform privacy. In other embodiments, the Trusted Party may include a Privacy CA and a virtual CA. The virtue CA can be generated by the human-machine recognition server according to a (n, t) threshold scheme. In this case, the identity certificate whose signature contains the trusted module ID may be generated by the Privacy CA, while the identity certificate whose signature contains the user ID and the trusted module ID may be generated by the virtual CA certificate according to the (n, t) threshold scheme. This design enhances the performance and may help to prevent a single point of failure (SPOF) attack.

The method and the system disclosed herein are helpful in avoiding the network resources from being abused by unauthorized users and malicious programs. The method and the system are to crack, and may have higher human-machine recognition accuracy, as compared to the prior art CAPTCHA techniques based on texts, images and sounds. In addition, because the user is not required to submit explicit user information and explicit platform information but only to submit third-party authorized credentials, user and the platform privacy may be protected. Furthermore, the disclosed method may effectively avoid platform substitution attacks by binding the user and the trusted module and using Privacy CA to verify and issue identity certificates. In comparison, the existing TCG trusted computing network connection may suffer platform substitute attacks because that system identifies the user first and then the user platform subsequently.

Figure 5:
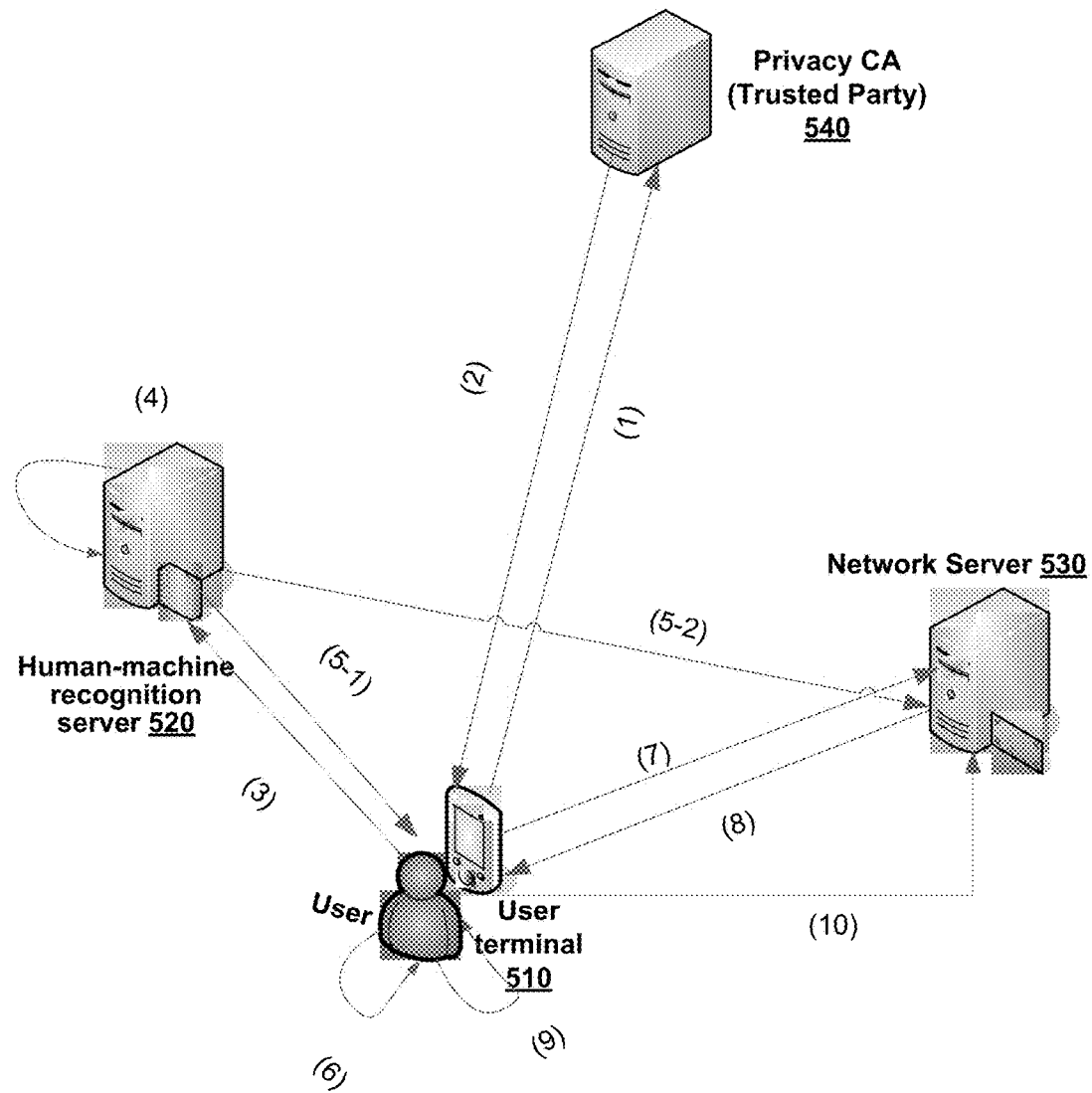
FIG. 5 is a flow diagram of an example process in accordance with the present disclosure.

The following is an example of a specific application of the above-described method and system, described below with reference to FIG. 5.

(1) Alice (user) requests identity enrollment with Privacy CA 540 (Trusted Party).

(2) Privacy CA 540 verifies Alice's EK credential and platform integrity, and assigns to Alice user_id & TPM_id, identity key and identity certificate based on the user_id & TPM-_id key. Assume user_id & TPM_id are Alice_001 & TPM_001.

(3) Alice submits to the human-machine recognition server 520 a request to access an e-commerce Web service. The request carries Alice's own identity certificate.

(4) Human-machine recognition server 520 verifies Alice's identity certificate and evaluates the legitimacy of the request.

(5-1) If Alice's identity certificate is legitimate, human-machine recognition server 520 assigns an authorization credential to Alice and sends it to Alice. The sent authorization credential carries human-machine recognition server 520's own identity certificate. The authorization credential is encrypted using Alice's identity information Alice_001 & TPM_001.

(5-2) At the same time, human-machine recognition server 520 synchronizes Alice's authorization credential to the network server 530. Alice's authorization credential is encrypted with the network server's identity information EC_001 & TPM_200. EC_001 & TPM_200 is obtained by the network server 530 from Privacy CA 540.

(6) Alice verifies human-machine recognition server 520's identity certificate, and obtains Alice's authorization credential by decrypting the received encrypted authorization credential.

(7) Alice requests access to the e-commerce service of the network server 530, using her authorization credential as proof.

(8) Network server 530 sends permission to access the requested e-commerce service, the permission carrying network server 530's identity certificate.

(9) Alice verifies the legitimacy of network server 530, and if verified, accesses the requested e-commerce service.

The above embodiments of the apparatus are related to the embodiments of the method described herein, and detailed description of the embodiments of the method is also applicable to the embodiments of the apparatus and is therefore not repeated.

The technique described in the present disclosure may be implemented in a general computing equipment or environment or a specialized computing equipment or environment, including but not limited to personal computers, server computers, hand-held devices or portable devices, tablet devices, multiprocessor systems, microprocessor-based systems, set-top boxes, programmable consumer devices, network PCs, microcomputers and large-scale mainframe computers, or any distributed environment including one or more of the above examples.

The modules in particular may be implemented using computer program modules based on machine executable commands and codes. Generally, a computer program module may perform particular tasks or implement particular abstract data types of routines, programs, objects, components, data structures, and so on. Techniques described in the present disclosure can also be practiced in distributed computing environments, such a distributed computing environment, to perform the tasks by remote processing devices connected through a communication network. In a distributed computing environment, program modules may be located in either local or remote computer storage media including memory devices.

It is appreciated that the potential benefits and advantages discussed herein are not to be construed as a limitation or restriction to the scope of the appended claims.

Methods and apparatus of information verification have been described in the present disclosure in detail above. Exemplary embodiments are employed to illustrate the concept and implementation of the present invention in this disclosure. The exemplary embodiments are only used for better understanding of the method and the core concepts of the present disclosure. Based on the concepts in this disclosure, one of ordinary skills in the art may modify the exemplary embodiments and application fields.

What is claimed is:

1. A method for distinguishing humans from computers, wherein any of a user terminal, a network server, and a trusted party may be at a decision point of a trusted network for distinguishing humans from computers, the method comprising:
  receiving from a plurality of user terminals a first request for network service access, the first request carrying a first identity certificate issued by the trusted party and signed by a signature containing a user identification (ID) tied to a trusted module ID identifying a trusted module embedded in and belonging to the plurality of user terminals;
  verifying the user ID and the trusted module ID according to the first identity certificate;
  determining whether the plurality of user terminals, having the user ID and the trusted module ID, requesting the network service access exceeds a threshold number by:
    counting a number of the plurality of user terminals, the number of the plurality of user terminals requesting network service access within a preset period of time, and
    comparing the counted number of the plurality of user terminals with the threshold number;
  deciding whether the first request for network service access is made by a human user based on whether the counted number exceeds the threshold number; and
  upon deciding the first request is made by a human user,
    transmitting, to a first user terminal of the plurality of user terminals, a user terminal authorization credential encrypted with user terminal identify information and a decision point identification certificate issued by the trusted party, and
    transmitting, to the network server, a network server authorization credential encrypted with network server identity information and the decision point identification certificate issued by the trusted party,
  wherein the first user terminal and network server authorization credentials are configured to enable the network server to verify the user terminal authorization credential against the network server authorization credential.

2. The method as recited in claim 1, wherein the first user terminal, the network server, and the trusted party each has a respective Trusted Computing platform implemented using a common Trusted Computing technology, and wherein the trusted module ID identifies a trusted module tied to the first user terminal, the trusted module being part of the Trusted Computing platform of the first user terminal.

3. The method as recited in claim 1, wherein the network server is at the decision point for deciding whether the first request for network service access is made by a human user.

4. The method as recited in claim 1, the method further comprising:
  rejecting the first request for network service access upon deciding that the first request is not made by a human user.

5. The method as recited in claim 1, further comprising:
  blacklisting the user ID and the trusted module ID upon deciding that the first request for network service access is not made by a human user.

6. The method as recited in claim 1, further comprising:
  before deciding whether the first request for network service access is made by a human user, checking the user ID and trusted module ID against a blacklist of user IDs and trusted module IDs.

7. A method for controlling access to network services, wherein the method is applicable on a trusted network having a trusted party, a user terminal, a decision point for distinguishing humans from computers, and a network server, the method comprising:
  receiving at the decision point from a plurality of user terminals a first request for network service access, the first request carrying a first identity certificate issued by the trusted party and signed by a signature containing a user identification (ID) tied to a trusted module ID identifying a trusted module embedded in and belonging to the plurality of user terminal;
  verifying, at the decision point, the user ID and the trusted module ID according to the first identity certificate;
  determining, at the decision point, whether the plurality of user terminals, having the user ID and the trusted module ID, requesting the network service access exceeds a threshold number by:
    counting a number of the plurality of user terminals, the number of the plurality of user terminals requesting network service access within a preset period of time, and
    comparing the counted number of the plurality of user terminals with the threshold number;
  deciding, at the decision point, whether the first request for network service access is made by a human user, based on whether the counted number exceeds the threshold number; and
  upon deciding the first request is made by a human user,
    transmitting, from the decision point to a first user terminal of the plurality of user terminal, a user terminal authorization credential encrypted with user terminal identity information, and
    transmitting, from the decision point to the network server, a network server authorization credential encrypted with network server identity information,
  wherein the first user terminal and network server authorization credentials are configured to enable the network server to verify the user terminal authorization credential against the network server authorization credential.

8. The method as recited in claim 7, wherein transmitting the user terminal authorization credential to the first user terminal comprises:
  encrypting the user terminal authorization credential using the user terminal identity information as a public key; and
  transmitting to the first user terminal the encrypted user terminal authorization credential along with a second identity certificate issued to the decision point by the trusted party.

9. The method as recited in claim 8, further comprising:
  verifying, at the first user terminal, the received second identity certificate; and
  obtaining, at the first user terminal, the user terminal authorization credential by decrypting the encrypted user terminal authorization credential using a private key corresponding to the user terminal identity information.

10. The method as recited in claim 7, wherein transmitting the network server authorization credential to the network server comprises:
  encrypting the network server authorization credential using the network server identity information as a public key; and
  sending to the network server the encrypted network server authorization credential along with a second identity certificate issued to the decision point by the trusted party.

11. The method as recited in claim 10, further comprising:
  verifying at the network server the received second identity certificate; and
  obtaining at the network server the network server authorization credential by decrypting the encrypted network server authorization credential using a private key corresponding to the network server identity information.

12. The method as recited in claim 7, further comprising:
  allowing the first user terminal to access the requested network service by:
    sending from the network server to the first user terminal a response indicating allowing access to the requested network service, the response carrying a third identity certificate issued to the network server by the trusted party;
    verifying the third identity certificate at the first user terminal; and
    accessing, by the user terminal, the requested network service.

13. The method as recited in claim 7, wherein the first user terminal, the network server, and the trusted party each has a respective Trusted Computing platform implemented using a common Trusted Computing technology, and wherein the trusted module ID identifies a trusted module tied to the first user terminal, the trusted module being part of the Trusted Computing platform of the user terminal.

14. The method as recited in claim 7, further comprising:
  blacklisting the user ID and the trusted module ID upon deciding that the first request for network service access is not made by a human user.

15. A computer-based apparatus for distinguishing humans from computers, the apparatus comprising:
  a computer having a processor, computer-readable memory and storage medium, and I/O devices, the computer being programmed to perform functions including:
    receiving from a plurality of user terminals a first request for network service access, the first request carrying a first identity certificate issued by the trusted party and signed by a signature containing a user identification (ID) tied to a trusted module ID identifying a trusted module embedded in and belonging to the plurality of user terminals;
    verifying the user ID and the trusted module ID according to the first identity certificate;
    determining whether the plurality of user terminals, having the user ID and the trusted module ID, requesting the network service access exceeds a threshold number by:
      counting a number of the plurality of user terminals, the number of the plurality of user terminals requesting network service access within a preset period of time, and
      comparing the counted number of the plurality of user terminals with the threshold number;
    deciding whether the first request for network service access is made by a human user based on whether the counted number exceeds the threshold number; and
    upon deciding the first request is made by a human user,
    transmitting, to a first user terminal of the plurality of user terminals, a user terminal authorization credential encrypted with user terminal identify information and a decision point identification certificate issued by the trusted party, and
    transmitting, to the network server, a network server authorization credential encrypted with network server identity information and the decision point identification certificate issued by the trusted party,
    wherein the first user terminal and network server authorization credentials are configured to enable the network server to verify the user terminal authorization credential against the network server authorization credential.

16. The computer-based apparatus as recited in claim 15, wherein the programmed functions further comprise:
  blacklisting the user ID and the trusted module ID upon deciding that the first request for network service access is not made by a human user.

17. The computer-based apparatus as recited in claim 15, wherein the programmed functions further comprise:
  allowing the first user terminal to access the requested network service if the user terminal authorization credential is verified successfully against the network server authorization credential.

18. The computer-based apparatus as recited in claim 15, wherein the programmed functions further comprise:
  allowing the first request for network service access, upon deciding at a decision point that the first request for network service access is made by a human user;
  encrypting the user terminal authorization credential using the user terminal identity information as a first public key; and
  encrypting the network server authorization credential using the network server identity information as a second public key.

19. The computer-based apparatus as recited in claim 15, wherein the programmed functions further comprise:
  transmitting from the network server to the first user terminal a response indicating allowing access to the requested network service, the response carrying a third identity certificate issued to the network server by the trusted party;

allowing the first user terminal to verify the third identity certificate; and allowing the first user terminal to access the requested network service.

20. The method as recited in claim 15, wherein the first user terminal, the network server, and the trusted party each has a respective Trusted Computing platform implemented using a common Trusted Computing technology, and wherein the trusted module ID identifies a trusted module tied to the first user terminal, the trusted module being part of the Trusted Computing platform of the first user terminal.

* * * * *